Patented Jan. 9, 1923.

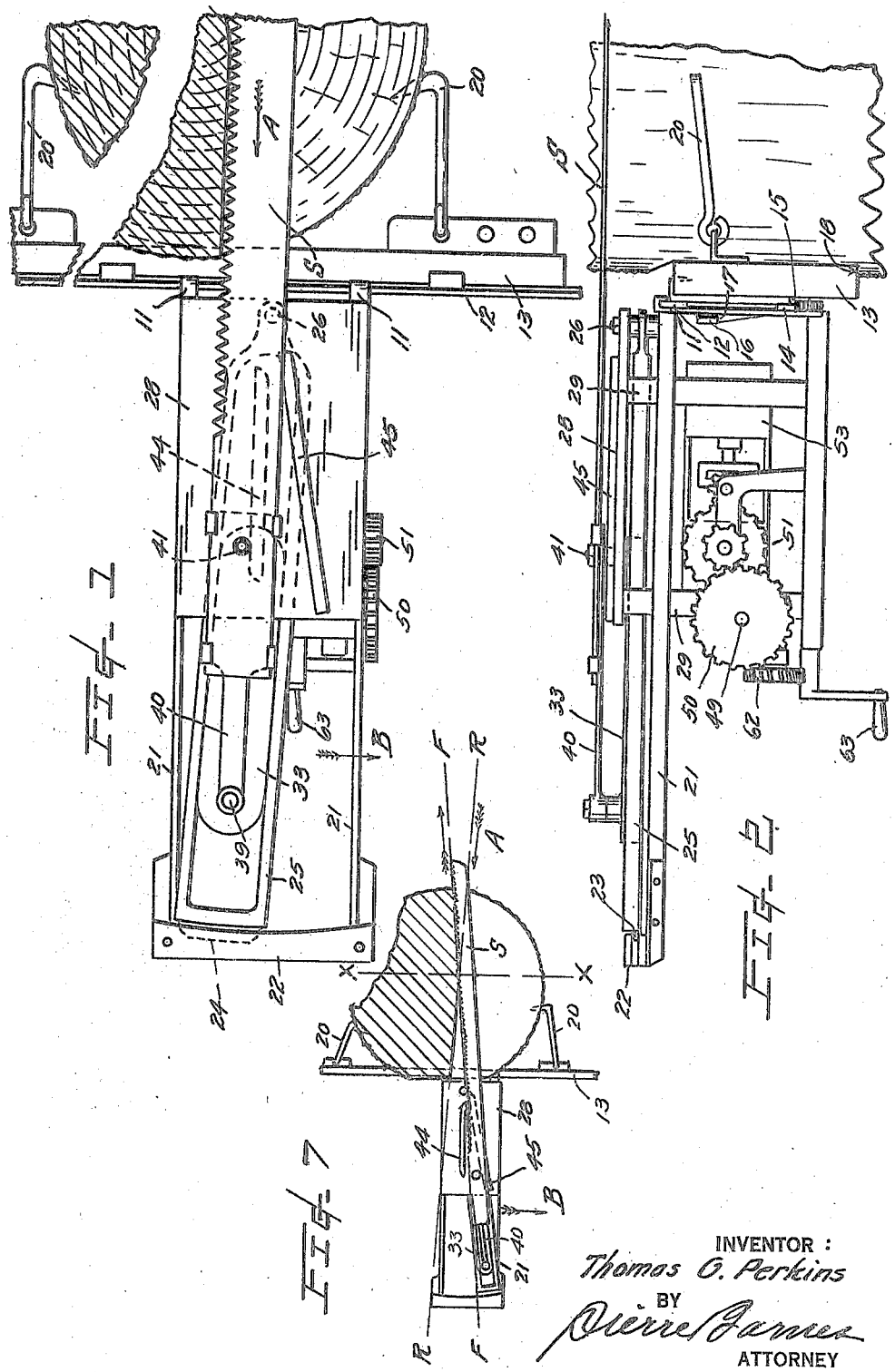

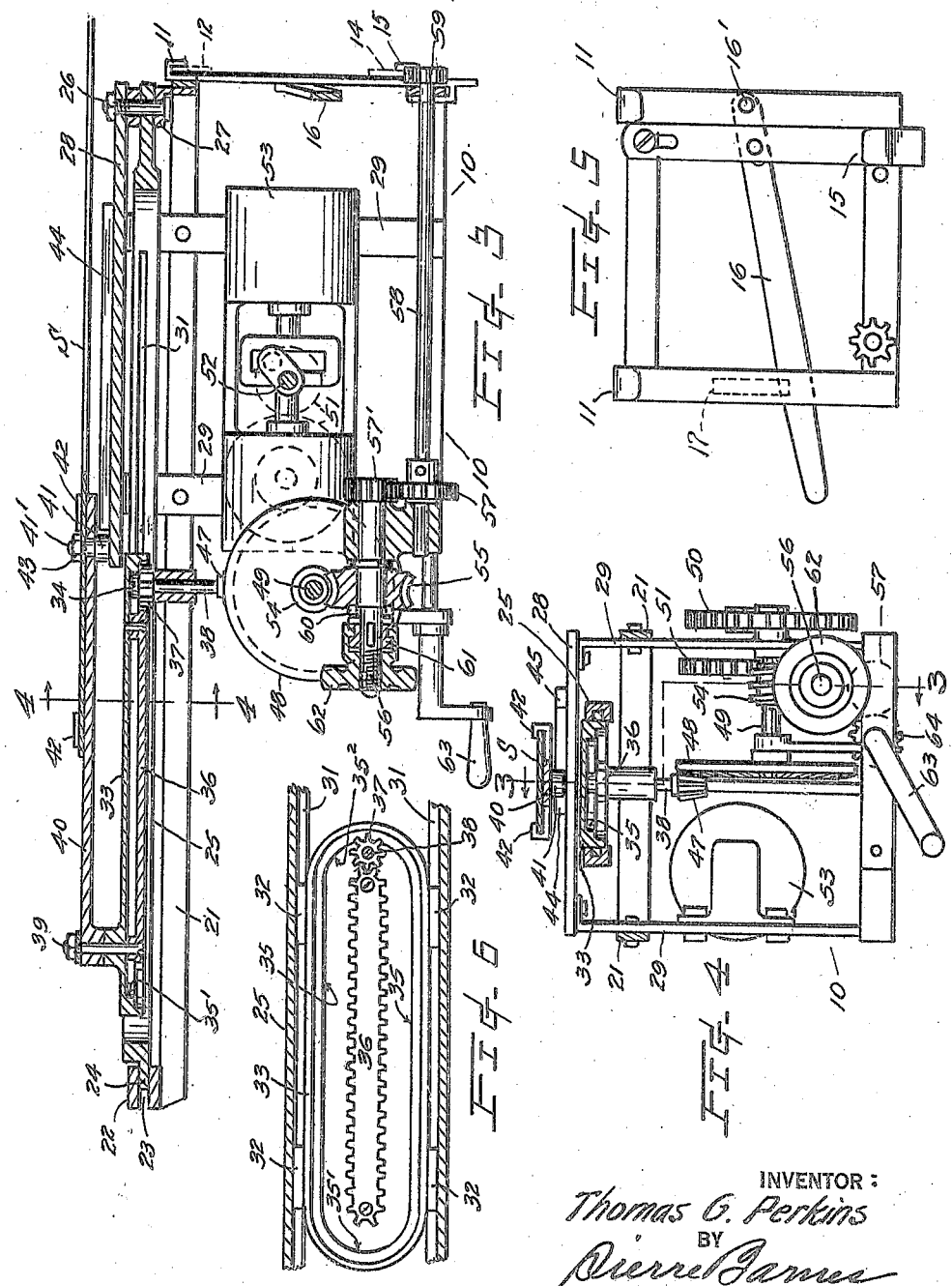

1,441,747

UNITED STATES PATENT OFFICE.

THOMAS G. PERKINS, OF SEATTLE, WASHINGTON.

TREE-SAWING MACHINE.

Application filed September 21, 1920. Serial No. 411,784.

*To all whom it may concern:*

Be it known that I, THOMAS G. PERKINS, a citizen of the United States, residing at Seattle, in the county of King and State of Washington, have invented certain new and useful Improvements in Tree-Sawing Machines, of which the following is a specification.

This invention relates to reciprocative sawing machines for felling standing timber, and has for its object to provide a machine of this character in which the reciprocatory movements of the saw are controlled to cause it to operate in a more rapid and effective manner than hitherto.

In other power reciprocating saws the saw blade is guided to produce a substantially straight cut the entire length of the kerf. In consequence of which sawdust collects in the kerf to not only interfere with the saw performing its work but also dulls the saw teeth. Besides the objections above mentioned an accumulation of sawdust in a kerf has a tendency to enter the interstices between the walls of the latter and the opposing surfaces of the saw blade, resulting in a considerable increase of friction necessitating the employment of a relatively large and heavy saw and operating machine therefor.

These and other difficulties are dispensed with by my invention by reason of the saw blade being actuated to cut in different angular directions in its successive strokes.

The invention consists in various features, details and combinations hereinafter described and claimed.

In the accompanying drawings, Figure 1 is a plan view of a sawing machine embodying my invention; Fig. 2 is a side elevation of the same; Fig. 3 is a vertical longitudinal section taken on broken line 3—3 of Fig. 4; Fig. 4 is a view partly in rear elevation and partly in transverse section, said section being taken through 4—4 of Fig. 3; Fig. 5 is a front elevational view of the machine frame; Fig. 6 is an underside plan view of the saw impelling devices, with a portion of the guiding means therefor which is shown in horizontal section; and Fig. 7 is a diagrammatic plan view illustrating the movements of the saw with respect to the work.

My improved machine has a frame, denoted generally by 10, provided at its front end with rigid hook elements 11 engageable over a track rail 12, Figs. 1 and 2, which is secured to a horizontal support 13, preferably of wood.

Also secured at a lower elevation to the piece 13 is a bar 14 having rack teeth along its lower edge and is offset from said piece to accommodate a hook element 15 (Fig. 5) which is connected to said frame for relative vertical movements.

The hooks 11 serve as hangers for suspending the machine, the same, while in operation, being secured by the hook 15 from being tilted upwardly.

The hook 15 is releasably held by a lever 16, fulcrumed at $16^1$ engaging upon a stop 17 provided on the frame as shown in Fig. 2. In practice, the machine supporting piece 13 itself is desirably supported upon a horizontal ledge as 18 provided by cutting a recess in the tree which is to be operated upon by the machine. Said piece is rigidly held against the tree by dogs, such as 20, engaging the same at opposite sides.

Side bar elements 21 of the frame are connected at their rear ends by a transverse member 22 provided with a slot 23 which serves as guideway for a tongue 24 provided at the rear end of a beam 25 which is swingable horizontally about a pivot pin 26 adjacent to the front end of the frame.

As shown in Fig. 3, the pin 26 is in the nature of a bolt extending through the frame member 27 and a platform member 28 supported by frame elements 29 to be above the beam 25. Between its ends the beam 25 is formed with parallel channeled rail elements to afford guide slots 31 for ribs 32 protruding laterally from a plane sided gear casing 33 of a general elliptical form in horizontal section. This casing is open from below and is formed interiorly with a continuous peripheral track for a roller 34. Said track comprising straight parallel side portions 35 and semicircular end portions $35^1$ and $35^2$, Fig. 6. Within the chamber of said casing is rack bar 36 having an endless series of teeth arranged parallel with said track and engaging the teeth of a pinion 37 upon an upright power driven shaft 38 journaled in bearings provided in the machine frame. The roller 34 acting against the aforedescribed track serves to retain the pinion 37 in engagement with the rack whereby the pinion operates to impart to the gear casing 33 endwise reciprocatory movements toward and from the pivotal pin 26 of beam 25 and also laterally with the beam.

39 represents a pin or bolt which extends upwardly from said gear casing and adjacent to its rear end where the maximum lateral movements obtain. This pin serves as a pivot for the rear end of an arm 40 whose forward end is supported by a stud 41 thereof bearing upon the platform 28.

S represents a saw blade having its rear end seated upon the forward portion of the arm 40 and fitting within slots of the arm lugs 42. The saw is bolted upon said arm by extending the screw threaded stem 41¹ of said stud upwardly through an aperture of the saw to receive a nut 43 above the latter.

Upon the top of platform 28 are strips 44 and 45 disposed in substantially the angular relations with each other which is shown in Fig. 1 and constitute guides for the stud 41 whereby the saw strokes are regulated.

More particularly, said stud will bear against the guide strip 44 in all rearward strokes of the saw, indicated by direction arrow A Figs. 1 and 7, until the beam 25 is swung by the aforesaid rack-and-pinion gearing in the direction denoted by B.

As said beam is swung away from the direction of travel of the machine, see Fig. 7, the saw has a rearward stroke and the stud 41 then bears against the guide strip 45.

Thus controlled by the devices above described, the cutting edge of the saw will coincide approximately with broken lines F—F and R—R in Fig. 7 in the successive forward and rearward strokes to accordingly provide a kerf having a bottom, so to speak, which is angular instead of straight.

The shaft 38 which drives the saw may itself be driven by any suitable means. As illustrated in the drawings, shaft 38 is rotated by bevel toothed gears 47, 48 from a shaft 49 which, in turn, is driven by a train of spur gears 50—51 from a crank shaft 52 rotated by a motor 53 of suitable type, preferably an explosion engine. The shaft 49, included in the above described driving mechanism, has rigidly mounted thereon a worm 54 (Figs. 3 and 4) which rotates a worm wheel 55 upon a stub shaft 56. The latter is in continuous connection by means of spur gears 57 and 57¹ with the feed shaft 58 which carries a toothed pinion 59 which engages the rack teeth of bar 14.

The worm wheel 55 is, however, releasably connected with its shaft 56 by suitable clutching means although I prefer the construction illustrated in Fig. 3. In such preferred form horns 60 provided on an end of the worm wheel act complementary to horns provided upon a clutch member 61 splined to the shaft and shifted into or out of couple with the worm wheel by means of a hand wheel 62 which is threaded upon the shaft 56.

When the worm wheel is engaged to such shaft the feed or travel of the machine is effected by the saw driving mechanism.

When the worm wheel is disengaged the machine may be manually shifted upon the track through the instrumentality of a crank handle 63 to rotate a pinion 64 to drive the feed shaft through the medium of the gear 57, shown in Fig. 4.

As illustrated in Figs. 1 and 2, the machine is set to operate upon the track rail element of a horizontal support 13 which is dogged to a tree.

For operation, the saw is actuated to reciprocate in strokes having different angular directions in the successive sawcuts which are effective only toward the outside of a tree from a vertical plane, denoted by $x$—$x$ Fig. 7, parallel with the travel of the machine.

By reason of this characteristic the saw kerf is kept clear of sawdust, thereby diminishing the extent of the wood which is cut in each stroke of the saw to less than one-half the diameter of a tree.

By such an arrangement, the entire machine, including the saw, may be of relatively light weight in construction, the saw can be reciprocated at a relatively high speed and with less power and expense than is possible with any other sawing machines known to me. In sawing with my machine into standing timber of large diameters, moreover, the saw teeth cut directly into the wood instead of dragging a quantity of sawdust back and forth in the kerf, thereby enabling the teeth to more effectively perform their function instead of comminuting sawdust into particles which act to dull the saw teeth.

What I claim, is,—

1. In a sawing machine, the combination with a frame, saw guiding devices provided on said frame, a beam pivotally connected at one of its ends to said frame for horizontal swinging movements, a casing guided for longitudinal movements in said beam, an arm pivotally connected at one end to said casing, means provided at the other end of said arm and engaging said devices, a saw carried by said arm, an endless toothed rack provided in said casing and a power driven pinion engaging said rack and cooperating with said guiding devices to impart reciprocating motion to the saw.

2. In a sawing machine, the machine frame having a platform member provided with saw guiding devices, a beam pivoted at one end to the frame below said platform, a casing carried in said beam for relative longitudinal motion, a saw, an arm secured to said saw, one end of said arm being pivotally connected to said casing, means depending from the other end of the arm to be supported upon the platform and engageable with the guiding devices thereof, and power rotated means working within said casing to impart motion to said arm for reciprocating the saw.

Signed at Seattle, Washington, this 10th day of September, 1920.

THOMAS G. PERKINS.

Witnesses:
 PIERRE BARNES.
 JAMES DOUD.